United States Patent
Eisen et al.

(10) Patent No.: US 9,676,044 B2
(45) Date of Patent: Jun. 13, 2017

(54) ROTARY CUTTING TOOL HAVING DISK-SHAPED CUTTER BODY PROVIDED WITH SUPPORT PADS

(71) Applicant: Iscar, Ltd., Tefen (IL)

(72) Inventors: Yaron Eisen, Kfar Vradim (IL); Roohi Mokthar, Julis (IL)

(73) Assignee: Iscar, Ltd., Tefen (IL)

( * ) Notice: Subject to any disclaimer, the term of this patent is extended or adjusted under 35 U.S.C. 154(b) by 562 days.

(21) Appl. No.: 14/135,164

(22) Filed: Dec. 19, 2013

(65) Prior Publication Data

US 2015/0174675 A1    Jun. 25, 2015

(51) Int. Cl.
   B23D 61/02    (2006.01)
   B23C 5/08     (2006.01)

(52) U.S. Cl.
   CPC .............. *B23D 61/025* (2013.01); *B23C 5/08* (2013.01); *B23B 2251/56* (2013.01); *B23C 2210/56* (2013.01); *Y10T 83/9403* (2015.04)

(58) Field of Classification Search
   CPC ... B23B 2251/56; B23C 2210/56; B23C 5/08; B23D 61/025
   See application file for complete search history.

(56) References Cited

U.S. PATENT DOCUMENTS

| | | | |
|---|---|---|---|
| 3,521,684 A | | 7/1970 | McRobert et al. |
| 3,701,187 A | | 10/1972 | Erkfritz |
| 4,160,616 A | * | 7/1979 | Winblad ................. B23B 51/00 408/144 |
| 4,407,263 A | * | 10/1983 | Murata ................... B28D 1/127 125/15 |
| 4,993,891 A | | 2/1991 | Kaminiski et al. |
| 6,431,799 B1 | | 8/2002 | Francis et al. |
| 6,632,131 B1 | * | 10/2003 | Buchholz ............. B23D 61/026 125/13.01 |
| 6,971,823 B2 | | 12/2005 | Satran et al. |

(Continued)

FOREIGN PATENT DOCUMENTS

| | | |
|---|---|---|
| JP | S58 56725 A | 4/1983 |
| JP | 2000-107923 | 4/2000 |

OTHER PUBLICATIONS

Search report dated Mar. 17, 2015 issued in PCT counterpart application (No. PCT/IL2014/051031).

*Primary Examiner* — Sara Addisu
(74) *Attorney, Agent, or Firm* — Womble Carlyle

(57) ABSTRACT

A cutting tool and cutter body assembly, including a disk-shaped cutter body and a plurality of support pads removably retained therein, the cutter body having an axis of rotation, two opposing end surfaces and a body peripheral surface extending therebetween. Each support pad intersects one of two annular-shaped planes equidistantly offset from opposite sides of a median plane perpendicular to the axis of rotation, and the cutter body intersects neither of the two annular-shaped planes. Each support pad is configured to make operative contact with a machined surface of a workpiece perpendicular to the axis of rotation. Each support pad has opposing upper and lower surfaces and a pad peripheral surface extending therebetween, the pad peripheral surface having an upper portion intersecting the upper surface, and the upper portion exhibiting N-fold rotational symmetry about a pad axis non-perpendicular to the lower surface.

50 Claims, 9 Drawing Sheets

(56) References Cited

U.S. PATENT DOCUMENTS

| | | |
|---|---|---|
| 2005/0117981 A1 | 6/2005 | Satran et al. |
| 2005/0224063 A1* | 10/2005 | Sakita .................... B28D 1/121 125/15 |
| 2009/0249607 A1 | 10/2009 | Kadosh |
| 2010/0158623 A1 | 6/2010 | Danielsson |
| 2011/0097164 A1 | 4/2011 | Choi et al. |
| 2012/0134759 A1 | 5/2012 | Jaeger et al. |
| 2012/0315102 A1 | 12/2012 | Hecht |

* cited by examiner

ROTARY CUTTING TOOL HAVING DISK-SHAPED CUTTER BODY PROVIDED WITH SUPPORT PADS

FIELD OF THE INVENTION

The present invention relates to a disk-shaped rotary cutting tool and a cutter body assembly having a plurality of support pads, for use in metal cutting processes in general, and for slotting and slitting operations in particular.

BACKGROUND OF THE INVENTION

Within the field of rotary cutting tools having a plurality of support pads, devices are known in which the support pads are arranged about the peripheral surface of a cutter body and configured to contact a workpiece in a radial direction, in order to stabilize and center the cutting tool. Support pads may also be referred to as "wear pads", "bearing pads", or "guide pads".

US 2010/0158623 discloses such a rotary cutting tool.

Within the field of rotary cutting tools used in slotting and slitting operations, devices are known in which a plurality of cutting inserts are arranged about the peripheral surface of a cutter body, and each cutting insert is configured to cut one of the two parallel slot surfaces.

US 2011/0097164 discloses such a rotary cutting tool.

Such rotary cutting tools may produce inaccurate slot widths due to axial cutting forces acting on the cutting tool.

SUMMARY OF THE INVENTION

In accordance with the present invention, there is provided a cutter body assembly comprising:

a disk-shaped cutter body and a plurality of support pads removably retained therein, the cutter body having an axis of rotation, a direction of rotation about the axis of rotation, two opposing end surfaces and a body peripheral surface extending therebetween, and each of the plurality of support pads protruding from one of the two opposing end surfaces, wherein a median plane perpendicular to the axis of rotation intersects the body peripheral surface, and two annular-shaped planes are equidistantly offset from opposite sides of the median plane by a first distance, and wherein each of the plurality of support pads intersects one of the two annular-shaped planes, and the cutter body intersects neither of the two annular-shaped planes.

Also in accordance with the present invention, there is provided a support pad removably retainable in a disk-shaped cutter body, comprising:

opposing upper and lower surfaces and a pad peripheral surface extending therebetween, the lower surface being planar and configured to abut an associated seat surface of a pad pocket in the cutter body, and the pad peripheral surface having an upper portion intersecting the upper surface, wherein the upper portion exhibits N-fold rotational symmetry about a pad axis, and wherein the pad axis is non-perpendicular to the lower surface.

Further in accordance with the present invention, there is provided a cutting tool comprising:

a cutter body assembly including a cutter body and a plurality of support pads removably retained therein, the cutter body having an axis of rotation, a direction of rotation about the axis of rotation, two opposing end surfaces and a body peripheral surface extending therebetween, and a plurality of cutting inserts removably retained in the cutter body and circumferentially spaced about the body peripheral surface, wherein a median plane perpendicular to the axis of rotation intersects the body peripheral surface, wherein each of the plurality of support pads is configured to make operative contact with a machined surface of a workpiece, and wherein the machined surface is perpendicular to the axis of rotation.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
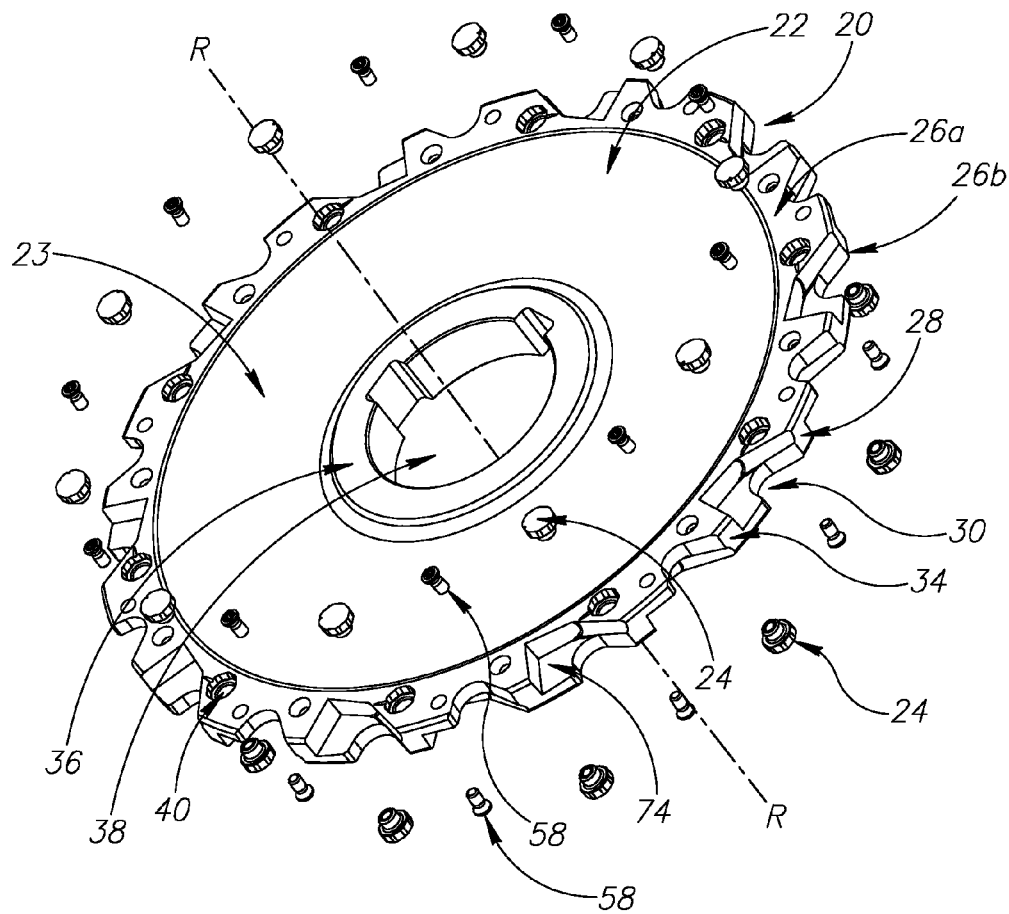
FIG. 1 is an exploded perspective view of a cutter body assembly in accordance with a first embodiment of the present invention.

Attention is first drawn to FIGS. 1 to 3, and 7 to 9, showing a cutter body assembly 20, 20' including a cutter body 22 and a plurality of support pads 24, 24' removably retained therein.

The cutter body 22 has an axis of rotation R, two opposing end surfaces 26a, 26b and a body peripheral surface 28 extending therebetween.

Figure 2:
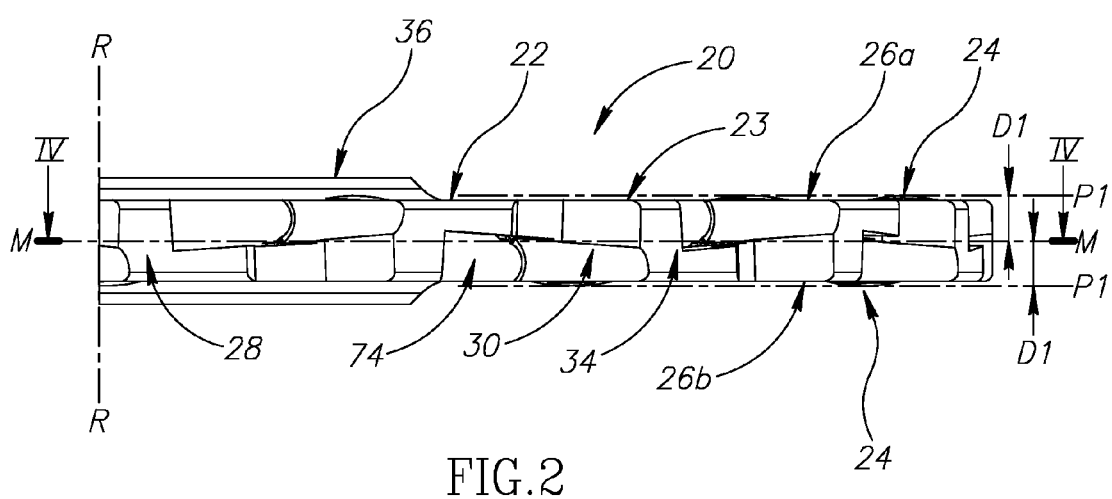
FIG. 2 is a partial side view of the cutter body assembly shown in FIG. 1.
Figure 8:
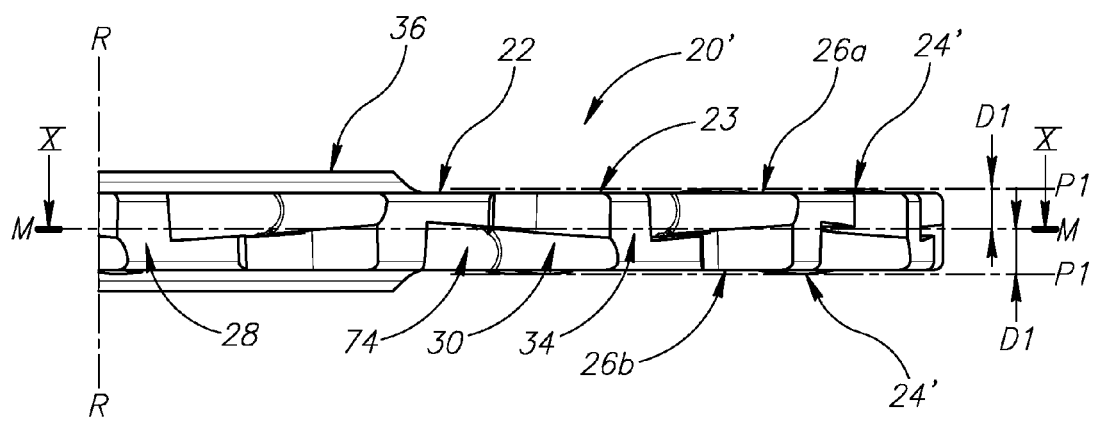
FIG. 8 is a partial side view of the cutter body assembly shown in FIG. 7.

As shown in FIGS. 2 and 8, a median plane M perpendicular to the axis of rotation R intersects the body peripheral surface 28.

In some embodiments of the present invention, each of the plurality of support pads 24, 24' may protrude from one of the two opposing end surfaces 26a, 26b.

Also, in some embodiments of the present invention, the median plane M may intersect the body peripheral surface 28 along its entire circumference.

As shown in FIGS. 1, 2, 7 and 8, the body peripheral surface 28 may have a plurality of circumferentially spaced apart body recesses 30 equal in number to the plurality of support pads 24, 24', and the median plane M may intersect each of the plurality of body recesses 30.

In some embodiments of the present invention, each of the plurality of body recesses 30 may open out to at least one of the two opposing end surfaces 26a, 26b.

Also, in some embodiments of the present invention, each of the plurality of body recesses 30 may open out to both opposing end surfaces 26a, 26b.

It should be appreciated that each body recess 30 may provide the space necessary to removably retain a cutting insert 32 and evacuate metal chips produced during a cutting operation.

In some embodiments of the present invention, the body peripheral surface 28 may have a plurality of outer peripheral portions 34 circumferentially alternating with the plurality of body recesses 30.

Figure 4:
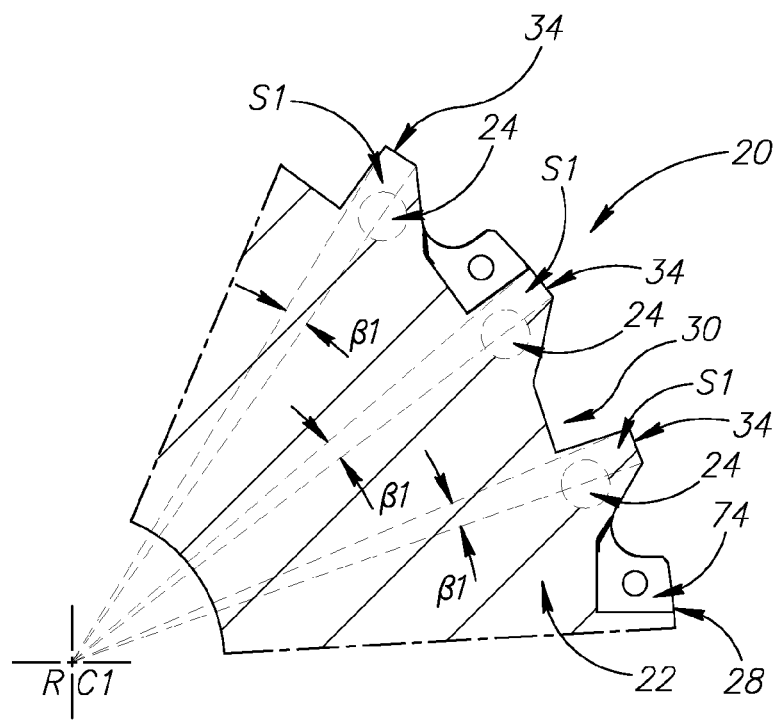
FIG. 4 is a partial cross-sectional view of the cutter body assembly shown in FIG. 2 taken along the line IV-IV, with axial projections of the associated support pads.
Figure 10:
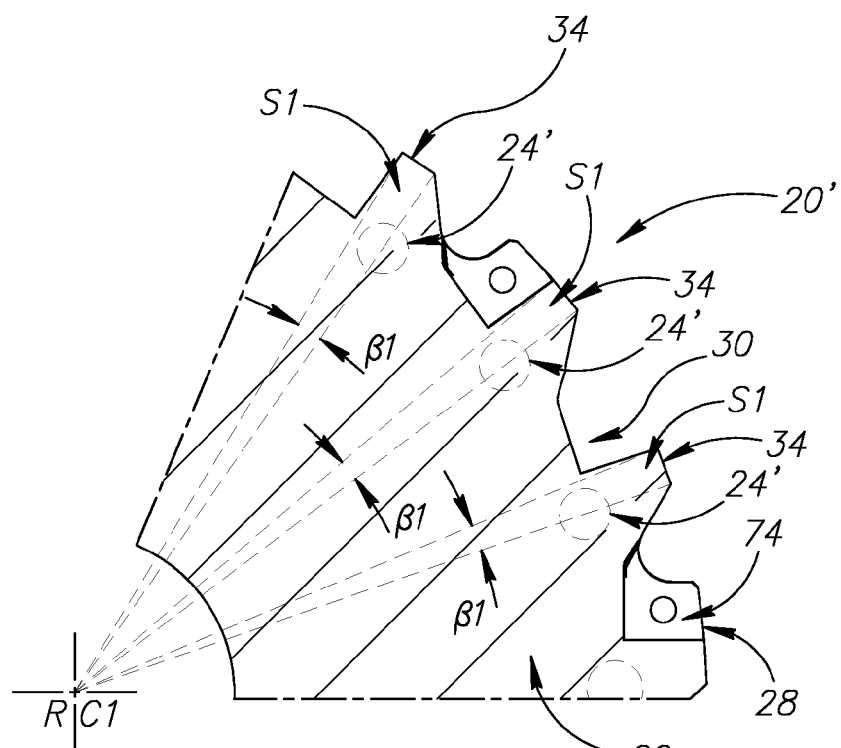
FIG. 10 is a partial cross-sectional view of the cutter body assembly shown in FIG. 8 taken along the line X-X, with axial projections of the associated support pads.

As shown in FIGS. 4 and 10, each outer peripheral portion 34 may intersect the median plane M to define the arc of a first pie-shaped sector S1 having a first center point C1 contained in the axis of rotation R, and each first pie-shaped sector S1 may at least partially contain the axial projection of a single support pad 24, 24'.

Also, in some embodiments of the present invention, the plurality of first pie-shaped sectors S1 may be identical to each other.

Further, in some embodiments of the present invention, each first pie-shaped sector S1 may subtend a first sector angle $\beta1$, and the first sector angle $\beta1$ may have a value of less than 15 degrees.

As shown in FIGS. 2 and 8, two annular-shaped planes P1 are equidistantly offset from opposite sides of the median plane M by a first distance D1, and each of the plurality of support pads 24, 24' intersects one of the two annular-shaped planes P1, and the cutter body 22 intersects neither of the two annular-shaped planes P1.

In some embodiments of the present invention, not all of the plurality of support pads 24, 24' may intersect the same annular-shaped plane P1.

Also, in some embodiments of the present invention, the plurality of support pads 24, 24' may be identical to each other, and an equal number of support pads 24, 24' may intersect each of the two annular-shaped planes P1.

As shown in FIGS. 1, 2, 7 and 8, the cutter body 22 is disk-shaped.

In some embodiments the cutter body 22 may have a radially inner central hub 36 connected to a radially outer annular body portion 23. The central hub 36 projects from at least one of the two opposing end surfaces 26a, 26b of the cutter body 22, and may have a central aperture 38 axially extending therethrough.

It should be appreciated that the central hub 36 intersects neither of the two annular-shaped planes P1 by virtue of the two annular-shaped planes P1 each having an inner diameter greater than an outer diameter of the central hub 36. Thus, the two annular-shaped planes P1 can be considered to face only the outer annular body portion 23.

Figure 7:
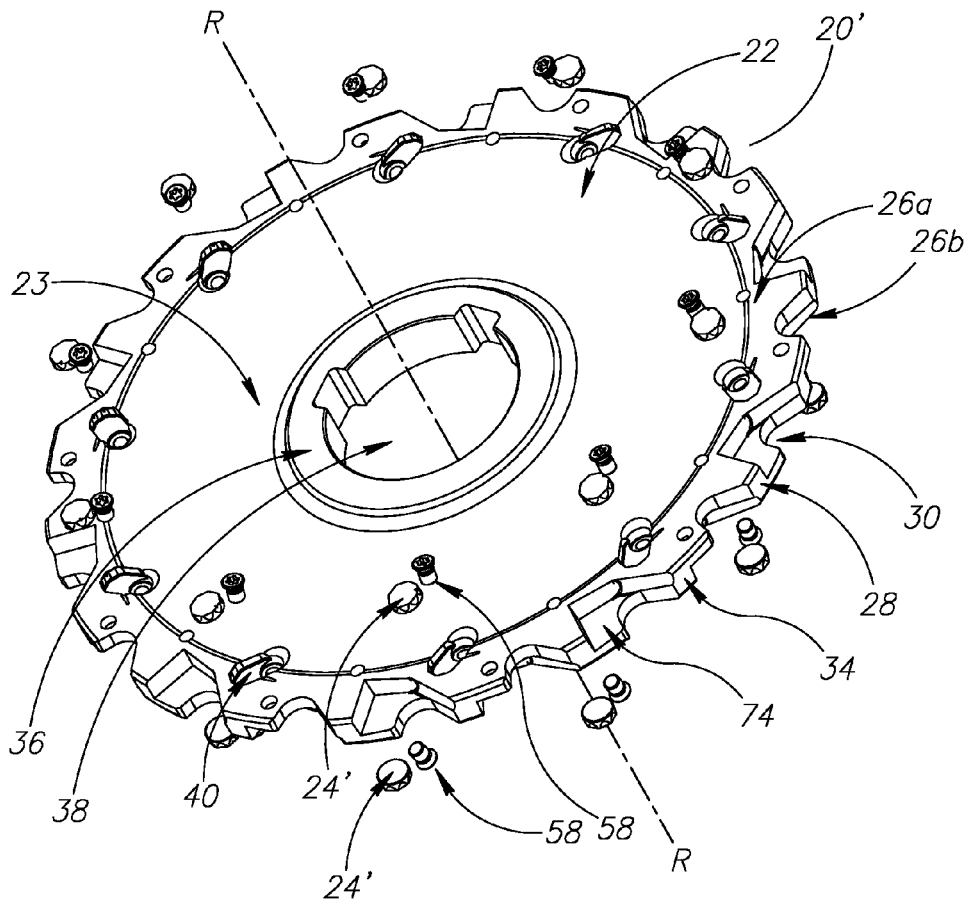
FIG. 7 is an exploded perspective view of a cutter body assembly in accordance with a second embodiment of the present invention.

As shown in FIGS. 1 and 7, the cutter body 22 may have a plurality of pad pockets 40 for mounting and indexing the plurality of support pads 24, 24'. The support pads 24, 24' protrude axially outward of the radially outer annular body portion 23.

In some embodiments of the present invention, as shown in FIGS. 5, 6, 11 and 12, each pad pocket 40 may have a planar seat surface 42 non-parallel to the median plane M, each support pad 24, 24' may have opposing upper and lower surfaces 44, 46 and a pad peripheral surface 48 extending therebetween, and each lower surface 46 may abut its associated seat surface 42 in each index position of the support pad 24, 24'.

Also, in some embodiments of the present invention, each seat surface 42 may form an acute first inclination angle $\alpha1$ with the median plane M, and the first inclination angle $\alpha1$ may have a value of less than 20 degrees.

Further, in some embodiments of the present invention, each seated support pad 24, 24' may have an axially outermost point No located a second distance D2 from the median plane M, and each support pad 24, 24' may be indexable in its associated pad pocket 40 to increase or decrease the second distance D2.

Still further, in some embodiments of the present invention, the axially outermost point No of each seated support pad 24, 24' may be formed on its upper surface 44, and each upper surface 44 may be convexly shaped.

It should be appreciated that the abutment of each lower surface 46 against its associated seat surface 42 in each index position of the seated support pad 24, 24' results in an advantageously stable configuration, which enables accurate and reliable adjustment of the second distance D2.

It should also be appreciated that the axially outermost point No of each seated support pad 24, 24' may be formed on a different portion of its upper surface 44 in each index position.

In some embodiments of the present invention, each support pad 24, 24' may be indexable about a pocket axis A1 perpendicular to its associated seat surface 42.

Figure 5:
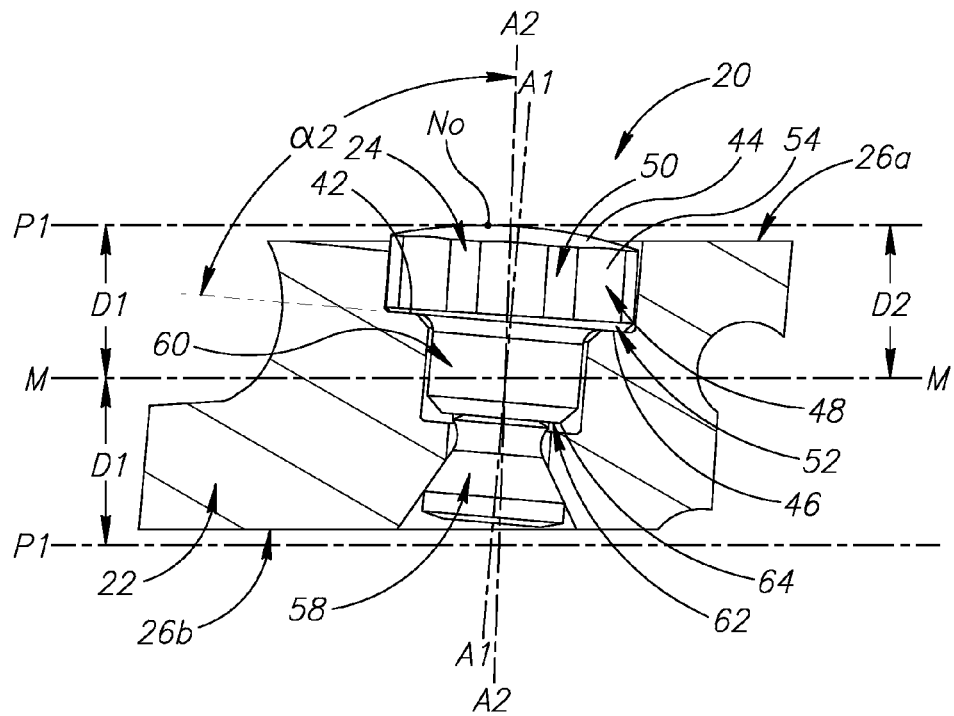
FIG. 5 is a cross-sectional view of the cutter body assembly shown in FIG. 3 taken along the line V-V, showing the associated support pad in a side view.
Figure 6:
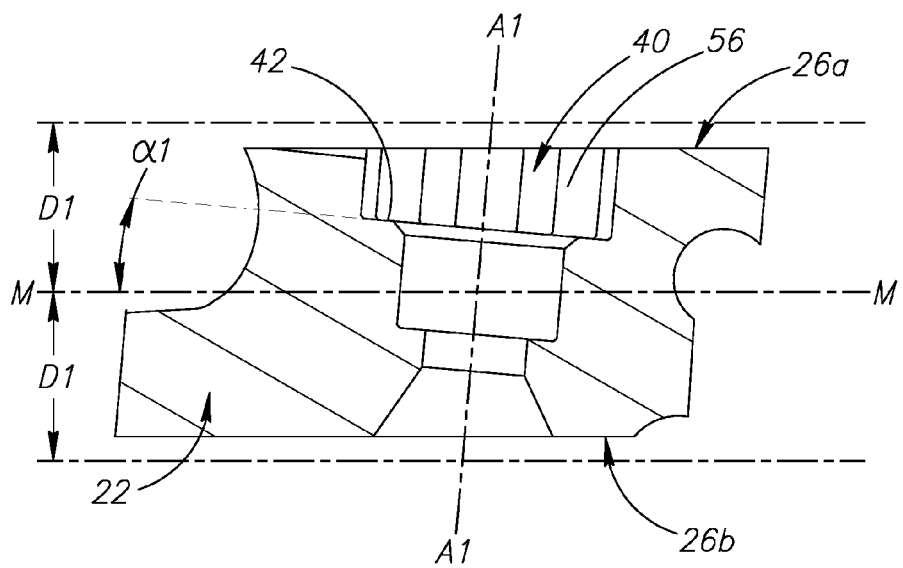
FIG. 6 is the cross-sectional view shown in FIG. 5, with the associated support pad removed.
Figure 11:
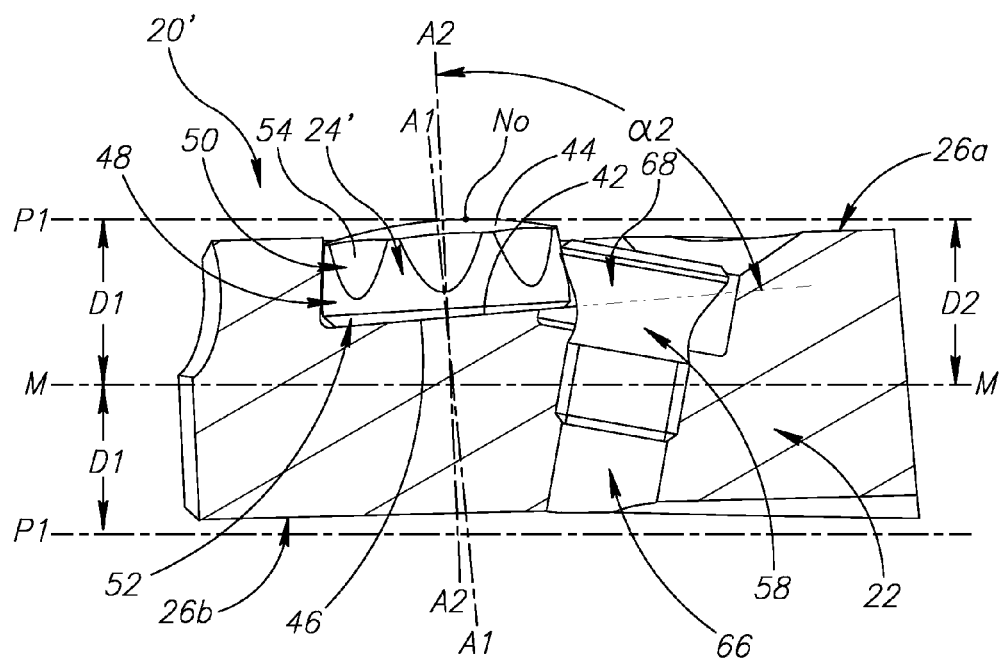
FIG. 11 is a cross-sectional view of the cutter body assembly shown in FIG. 9 taken along the line XI-XI, showing the associated support pad in a side view.
Figure 12:
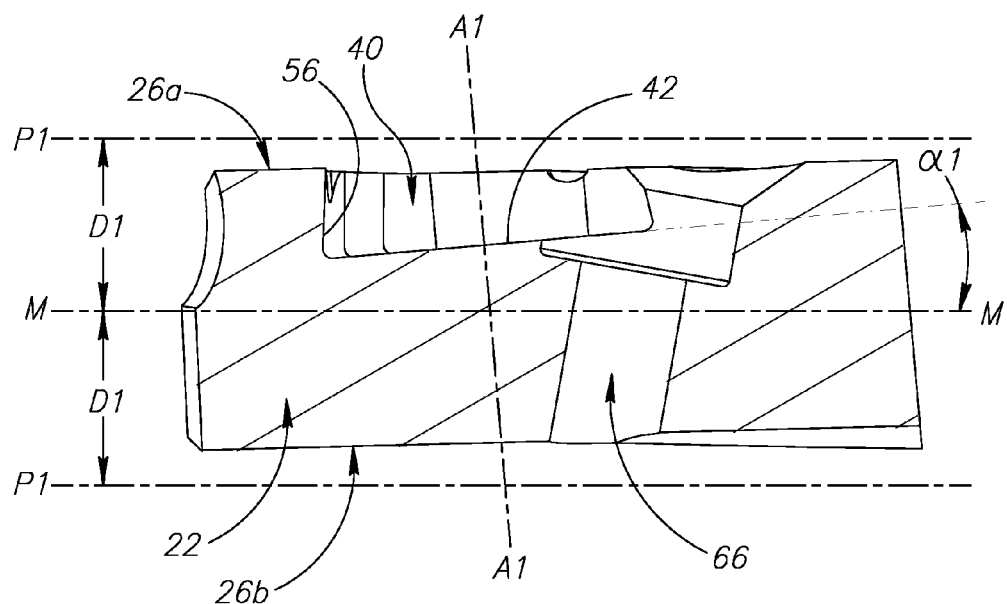
FIG. 12 is the cross-sectional view shown in FIG. 11, with the associated support pad removed.
Figure 13:
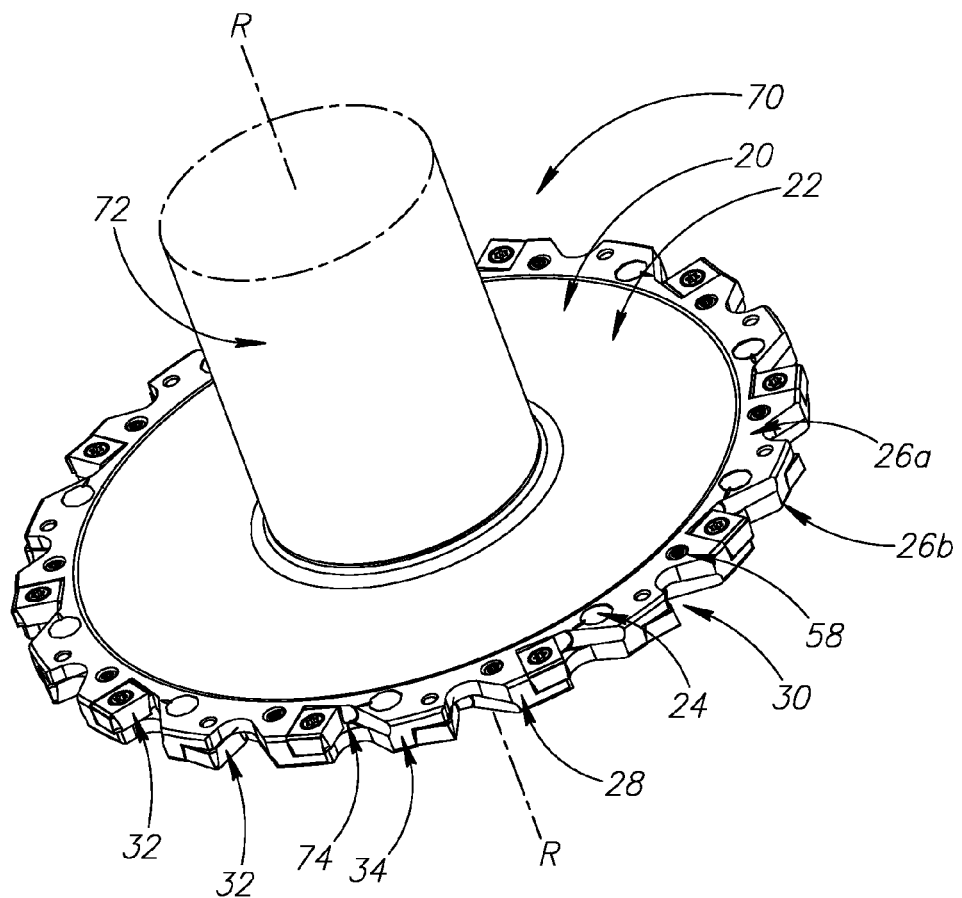
FIG. 13 is a perspective view of a cutting tool in accordance with some embodiments of the present invention.

As shown in FIGS. 5 and 11, each pad peripheral surface 48 may have an upper portion 50 intersecting its associated upper surface 44, and each upper portion 50 may exhibit N-fold rotational symmetry about a pad axis A2 which passes through the center of the upper surface 44.

In some embodiments of the present invention, each support pad 24, 24' may have N index positions in its associated pad pocket 40, and the pad axis A2 may be non-perpendicular to its associated seat surface 42.

Also, in some embodiments of the present invention, each pad peripheral surface 48 may have a lower portion 52 intersecting its associated lower surface 46, and the lower portion 52 may be wedge-shaped in a side view of the support pad 24, 24'.

Further, in some embodiments of the present invention, each lower surface 46 may be planar, and each pad axis A2 may be non-perpendicular to its associated lower surface 46. In one embodiment, the pad axis A2 forms an angle of between 88°-89° with the lower surface 46.

As shown in FIGS. 5 and 11, each pad axis A2 may form an acute second inclination angle α2 with its associated seat surface 42, and the second inclination angle α2 may have a value of greater than 80 degrees.

It should be appreciated that for embodiments of the present invention where the pocket and pad axes A1, A2 are non-coaxial, the upper portion 50 may be eccentrically indexable about the pocket axis A1.

It should also be appreciated that the provision of N index positions for each support pad 24, 24' in its associated pad pocket 40 enables incremental adjustment of the second distance D2.

In some embodiments of the present invention, N may be a value of at least three.

Also, in some embodiments of the present invention, N may be a value of at most sixteen.

Further, in some embodiments of the present invention, N may be an even number, and the second distance D2 may be set to maximum and minimum values at two rotationally opposite index positions.

It should be appreciated that for embodiments where N is an even number, the second distance D2 may have (N−2)/2 increments between its maximum and minimum values. For example, for a total of N=8 index positions, there may be four distance increments upon indexing (i.e., "rotating") the support pad from an initial 0° position by 45°, 90°, 135° and 180° in either direction. Furthermore, the distance increment from one index position to the next need not be equal. For example, in one embodiment, indexing the support pad from the 0° position to 45°, 90°, 135° and 180° may result in stepwise distance increments of +0.010 mm, +0.0250 mm, +0.040 mm and +0.045 mm, respectively.

Figure 3:
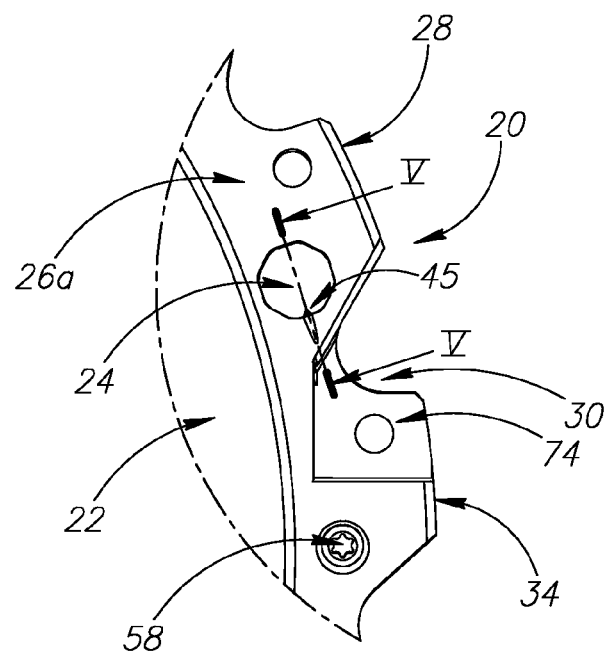
FIG. 3 is a partial end view of the cutter body assembly shown in FIG. 1.
Figure 9:
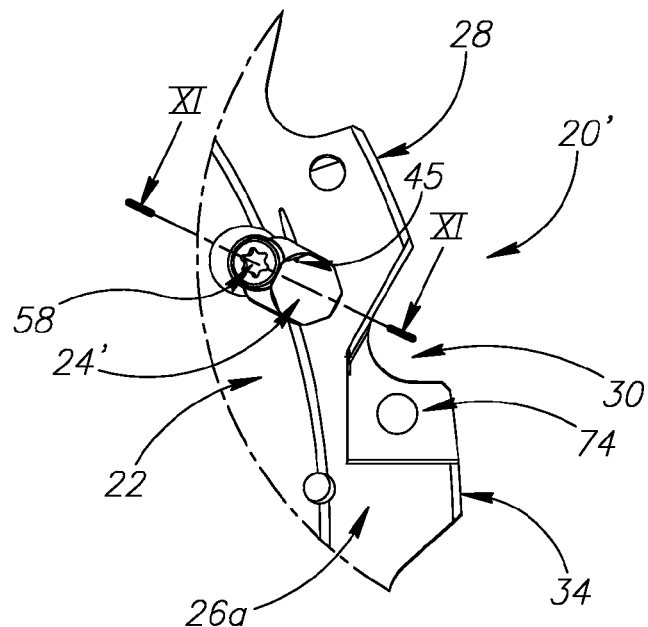
FIG. 9 is a partial end view of the cutter body assembly shown in FIG. 7.

As seen in FIGS. 3 and 9, the upper surface 44 may be provided with indexing indicia 45 reflective of a current index position of a support pad 24, 24'. In one embodiment, the index indicia comprises a notch formed at a particular circumferential location on the upper surface 44. In another embodiment, the index indicia may take the form of alphanumeric characters or other symbols.

In some embodiments of the present invention, the second distance D2 associated with each support pad 24, 24' may be equal to or greater than the first distance D1.

It should be appreciated that in some embodiments of the present invention, the second distance D2 may be equal to the first distance D1 in one index position of the associated support pad 24, 24', and the second distance D2 may be greater than the first distance D1 in N−1 index positions of the associated support pad 24, 24'.

In some embodiments of the present invention, each upper portion 50 may have N planar facets 54, and at least three consecutive planar facets 54 about the pad axis A2 may face an equal number of corresponding planar walls 56 in the associated pad pocket 40.

It should be appreciated that the provision of the at least three planar walls 56 in each pad pocket 40 may assist the operator to perform swift and repeatable indexing of the associated support pad 24, 24' and restrict inadvertent rotation of the support pad 24, 24' in the pad pocket 40.

In some embodiments of the present invention, each support pad 24, 24' may be removably fastened in its associated pad pocket 40 by means of a fastening screw 58.

In a first embodiment of the present invention, as shown in FIG. 5, each support pad 24 may have a protuberance 60 extending away from its lower surface 46, and the fastening screw 58 may threadingly engage a first threaded bore 62 in a distal surface 64 of the protuberance 60.

Also, in the first embodiment of the present invention, the first threaded bore 62 may be coaxial with the pocket axis A1, when the support pad 24 is seated therein.

Further, in the first embodiment of the present invention, the support pad 24 may be manufactured from hardened steel.

It should be appreciated that the first embodiment of the present invention provides an advantageously compact configuration of the each support pad 24 in combination with its fastening screw 58.

In a second embodiment of the present invention, as shown in FIG. 11, each support pad 24' may not have a protuberance extending away from its lower surface 46, and the fastening screw 58 may threadingly engage a second threaded bore 66 in the pad pocket 40, and a screw head 68 of the fastening screw 58 may abut one of the planar facets 54 of the support pad 24'.

Also, in the second embodiment of the present invention, the support pads 24' may be manufactured from cemented carbide.

It should be appreciated that the support pads 24' associated with second embodiment of the present invention may be simply and inexpensively manufactured by means of a pressing and sintering process.

Attention is now drawn to FIGS. 13 to 16, showing a cutting tool 70 including the cutter body assembly 20 and a plurality of cutting inserts 32 removably retained in the cutter body 22 and circumferentially spaced about the body peripheral surface 28.

In some embodiments of the present invention, the cutter body 22 may be coupled with a tool shank 72 extending along the axis of rotation R.

Also, in some embodiments of the present invention, each cutting insert 32 may be directly mounted in an insert receiving pocket 74 in its respective body recess 30.

In other embodiments of the present invention (not shown), each cutting insert may be indirectly mounted in its respective insert receiving pocket by means of a cartridge permitting axial position adjustment of the cutting insert.

Figure 14:
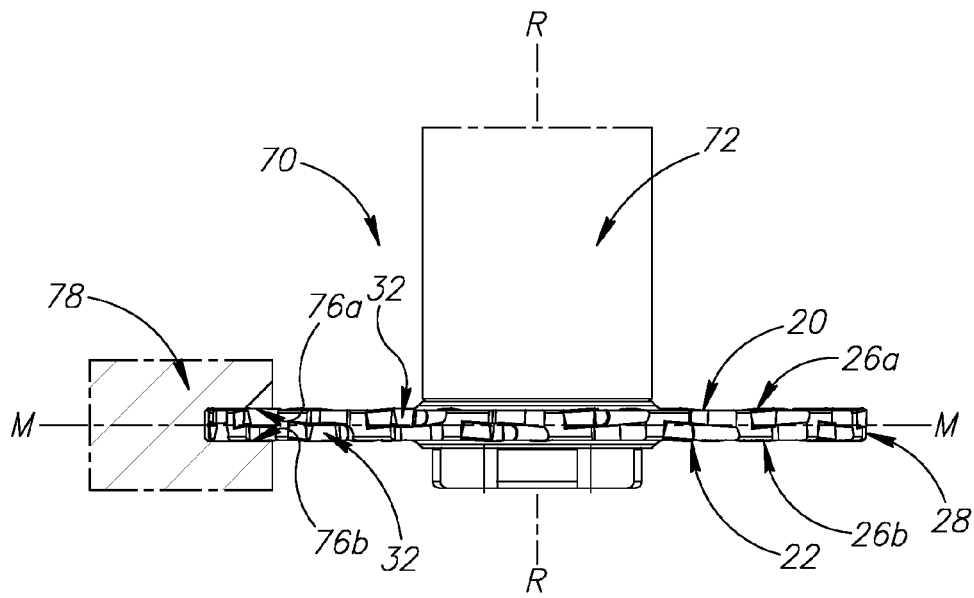
FIG. 14 is a side view of the cutting tool shown in FIG. 13, engaging a workpiece.
Figure 15:
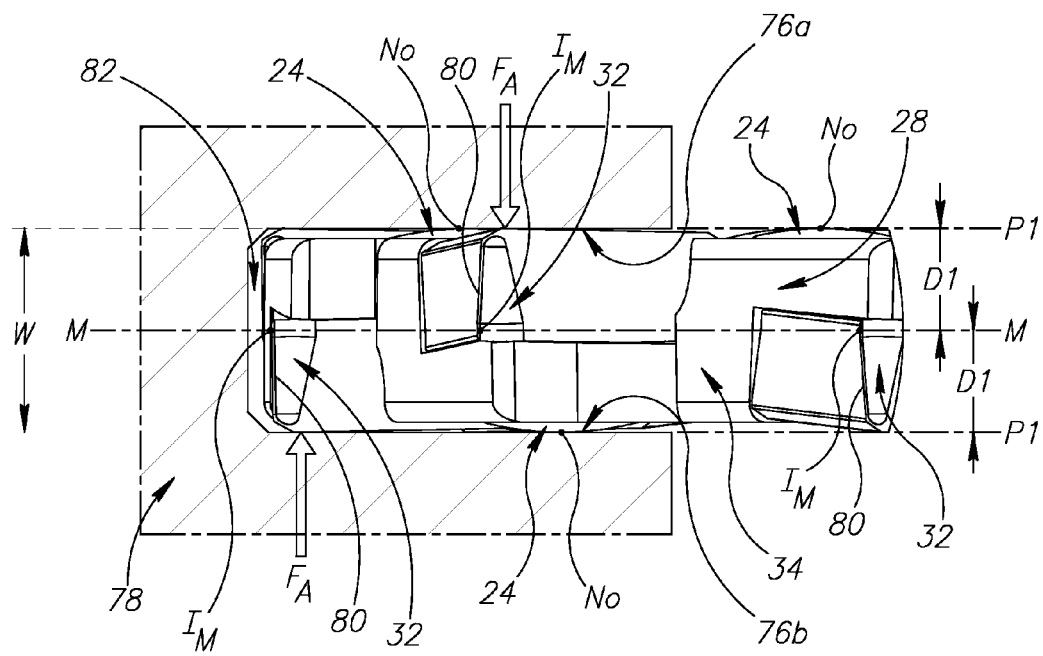
FIG. 15 is a detailed view of the cutting tool shown in FIG. 14.

According to the present invention, as shown in FIGS. 14 and 15, each of the plurality of support pads 24 is configured to make operative contact with a machined surface 76a, 76b of a workpiece 78, and the machined surface 76a, 76b is perpendicular to the axis of rotation R.

In some embodiments of the present invention, the total number of support pads 24 and the total number of cutting inserts 32 may be equal.

Also, in some embodiments of the present invention, the upper surface 44 of each support pad 24 may make operative contact with its associated machined surface 76a, 76b, to stabilize the rotating cutter body 22 as it cuts deeper into the workpiece 78.

It should be appreciated that for embodiments of the present invention where the upper surface 44 of each support pad 24 is convexly shaped, low-friction operative contact is made with its associated machined surface 76a, 76b at a single contact point.

It should also be appreciated that the single contact point associated with each support pad 24 may coincide with its axially outermost point No, which advantageously with respect to extended service life, may be formed on a different portion of its upper surface 44 in each index position.

In some embodiments of the present invention, an operative cutting edge 80 of each of the plurality of cutting inserts 32 may intersect exactly one of the two annular-shaped planes P1 and also the median plane M at a median intersection point $I_M$.

Also, in some embodiments of the present invention, not all of the plurality of operative cutting edges 80 may intersect the same annular-shaped plane P1.

Further, in some embodiments of the present invention, the plurality of cutting inserts 32 may be identical to each other, and an equal number of operative cutting edges 80 may intersect each of the two annular-shaped planes P1.

As shown in FIGS. 14 and 15, the rotary cutting tool 70 may be configured to cut a slot 82 in the workpiece 78 having two parallel machined surfaces 76a, 76b, and the slot 82 may have a slot width W equal to or greater than two times the first distance D1.

In some embodiments of the present invention, the median plane M may bisect the slot 82.

It should be appreciated that cutting inserts 32 having operative cutting edges 80 which intersect exactly one of the two annular-shaped planes P1 may cut only one of the two parallel machined surfaces 76a, 76b and a portion of the slot width W, and such cutting inserts 32 may be termed 'half-effective'.

It should also be appreciated that 'half-effective' cutting inserts 32 may cause axial cutting forces $F_A$ to act on the cutting tool 70 in a direction away from their associated machined surface 76a, 76b.

In some embodiments of the present invention, the cutting tool 70 may be set-up to perform a slotting or slitting operation by indexing each support pad 24 so that D2=W/2. This ensures that each support pad 24 makes operative contact with its associated machined surface 76a, 76b, which advantageously restricts axial deflection of the cutting tool 70 caused by 'half-effective' cutting inserts 32 engaging the opposite machined surface 76a, 76b, thus resulting in a highly accurate slot width W. In such case, the support pads 24 collectively have an axial extent corresponding to the slot width W.

It should also be appreciated that indexing of support pads 24 during set-up may be performed in response to worn operative cutting edges 80, or alternatively, in other embodiments of the present invention (not shown), where cutting inserts have undergone axial position adjustment in the cutting tool.

In some embodiments of the present invention, two circumferentially adjacent support pads 24 may intersect different annular-shaped planes P1.

Also, in some embodiments of the present invention, the operative cutting edges 80 of two circumferentially adjacent cutting inserts 32 may intersect different annular-shaped planes P1.

Figure 18:
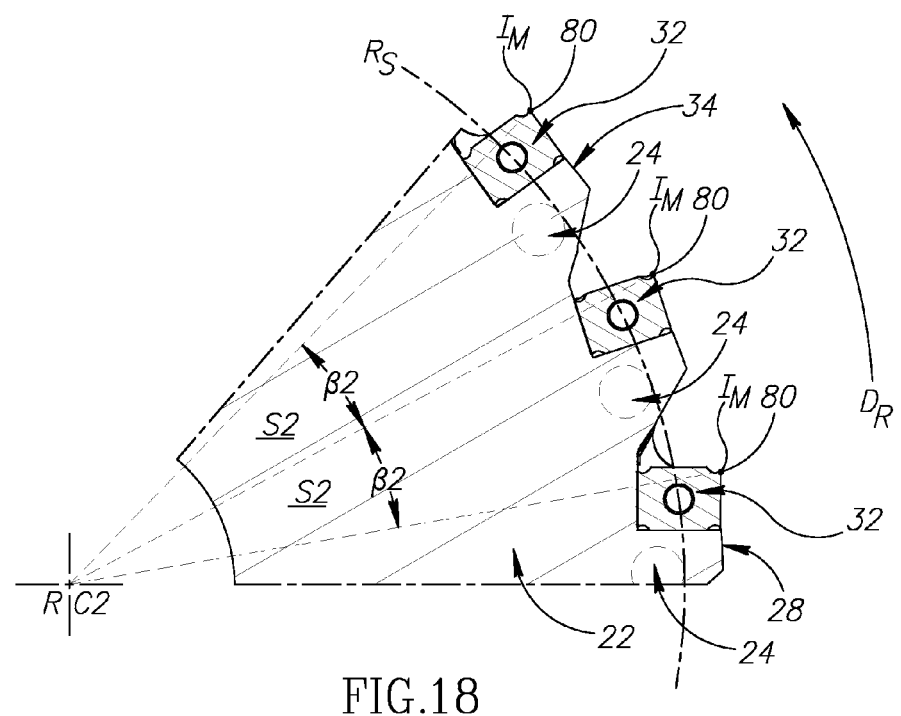
FIG. 18 is partial cross-sectional view of the cutting tool shown in FIG. 17 taken along the line XVIII-XVIII, with axial projections of the associated support pads.

As shown in FIG. 18, the median intersection points $I_M$ of two circumferentially adjacent cutting inserts 32 may define the arc end points of a second pie-shaped sector S2 having a second center point C2 contained in the axis of rotation R, and each second pie-shaped sector S2 may contain the axial projection of just a single support pad 24.

In some embodiments of the present invention, the plurality of second pie-shaped sectors S2 may be identical to each other.

Further, in some embodiments of the present invention, each second pie-shaped sector S2 may subtend a second sector angle β2, and the second sector angle β2 may have a value of less than 30 degrees.

Figure 16:
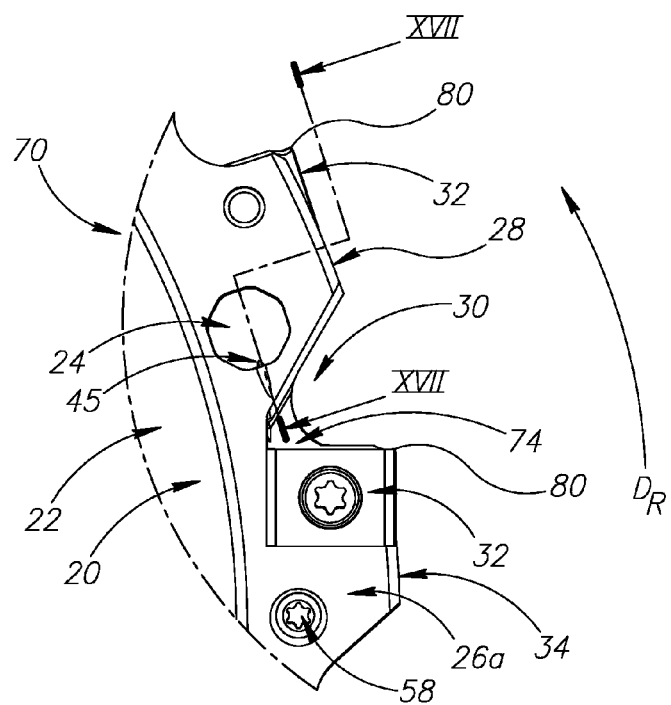
FIG. 16 is a partial end view of the cutting tool shown in FIG. 13.
Figure 17:
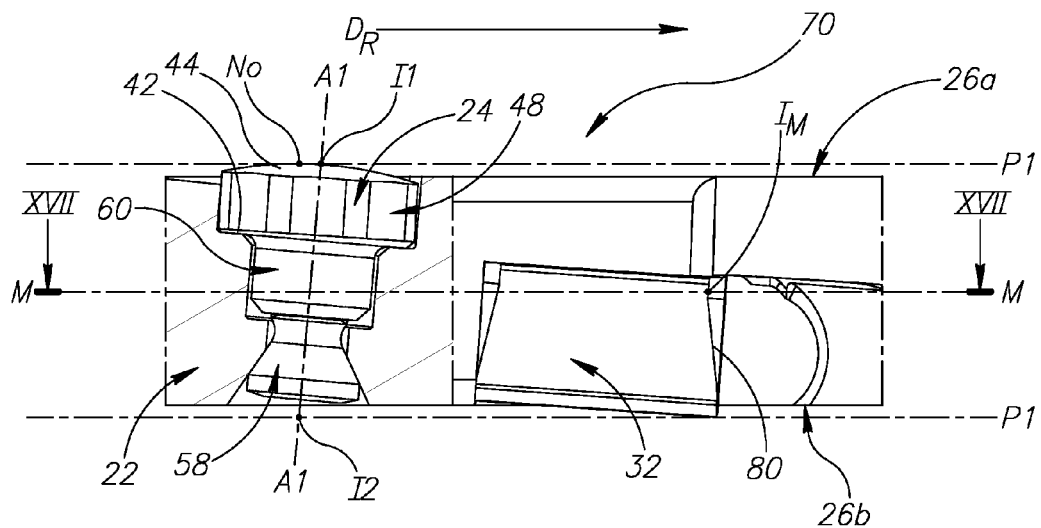
FIG. 17 is a cross-sectional view of the cutting tool shown in FIG. 16 taken along the line XVII-XVII.

As shown in FIGS. 16 and 17, the cutting tool 70 has a direction of rotation DR about the axis of rotation R.

In some embodiments of the present invention, where the operative cutting edges 80 of two circumferentially adjacent cutting inserts 32 intersect different annular-shaped planes P1, each support pad 24 may be located rotationally rearward of the circumferentially adjacent cutting insert 32 whose operative cutting edge 80 intersects a different annular-shaped plane P1 to that of the support pad 24.

Also, in some embodiments of the present invention, each pocket axis A1 may intersect the two annular-shaped planes P1 at first and second intersection points I1, I2. Each first intersection point I1 may be located rotationally forward of its associated second intersection point I2, and each seat surface 42 may face towards the annular-shaped plane P1 containing its associated first point I1.

It should be appreciated that locating the first intersection point I1 rotationally forward of its associated second intersection point I2 advantageously orientates the support pad 24 with respect to its associated machined surface 76a, 76b such that the risk of scraping and/or marking is minimized.

As shown in FIG. 18, the axial projection of each support pad 24 may radially overlap its two circumferentially adjacent cutting inserts 32. As also seen in this figure, the radially outermost portion of the support pads 24, as indicated by an arcuate boundary line Rs, is radially inward of the operative cutting edges 80 and also radially inward of the outer peripheral portions 34 of the body peripheral surface 28. Meanwhile, as seen in FIG. 17, the axially outermost point No of each support pad 24 is located axially outward of the associated end surface 26a of the cutter body 22.

It should be appreciated that radial overlap of each support pad's axial projection and its two circumferentially adjacent cutting inserts 32 advantageously restricts axial deflection of the cutting tool 70, thus contributing to a highly accurate slot width W.

In some embodiments of the present invention, as shown in FIG. 18, the axial projection of each support pad 24 may be located closer to the circumferentially adjacent cutting insert 32 whose operative cutting edge 80 intersects a different annular-shaped plane P1 to that of the support pad 24 than the circumferentially adjacent cutting insert 32 whose operative cutting edge 80 intersects the same annular-shaped plane P1 as that of the support pad 24.

It should also be appreciated that configuring each support pad 24 such that its axial projection is located closer to the circumferentially adjacent cutting insert 32 whose operative cutting edge 80 intersects a different annular-shaped plane P1 to that of the support pad 24, advantageously restricts axial deflection of the cutting tool 70, thus contributing to a highly accurate slot width W.

Although the present invention has been described to a certain degree of particularity, it should be understood that various alterations and modifications could be made without departing from the spirit or scope of the invention as hereinafter claimed.

What is claimed is:
1. A cutter body assembly (20, 20') comprising:
 a disk-shaped cutter body (22) and a plurality of support pads (24, 24') removably retained therein,
 the cutter body (22) having an axis of rotation (R), a direction of rotation (DR) about the axis of rotation (R), two opposing end surfaces (26a, 26b) and a body peripheral surface (28) extending therebetween, and
 each of the plurality of support pads (24, 24') protruding from one of the two opposing end surfaces (26a, 26b),
 wherein a median plane (M) perpendicular to the axis of rotation (R) intersects the body peripheral surface (28), and two annular-shaped planes (P1) are equidistantly offset from opposite sides of the median plane (M) by a first distance (D1),
 wherein each of the plurality of support pads (24, 24') intersects one of the two annular-shaped planes (P1), and the cutter body (22) intersects neither of the two annular-shaped planes (P1); and
 wherein not all of the plurality of support pads (24, 24') intersect the same annular-shaped plane (P1).

2. The cutter body assembly (20, 20') according to claim 1, wherein the median plane (M) intersects the body peripheral surface (28) along its entire circumference.

3. The cutter body assembly (20, 20') according to claim 1, wherein the body peripheral surface (28) has a plurality of circumferentially spaced apart body recesses (30) equal in number to the plurality of support pads (24, 24'), and
 wherein the median plane (M) intersects each of the plurality of body recesses (30).

4. The cutter body assembly (20, 20') according to claim 3, wherein each of the plurality of body recesses (30) opens out to at least one of the two opposing end surfaces (26a, 26b).

5. The cutter body assembly (20, 20') according to claim 3, wherein each of the plurality of body recesses (30) opens out to both opposing end surfaces (26a, 26b).

6. The cutter body assembly (20, 20') according to claim 3, wherein the body peripheral surface (28) has a plurality of outer peripheral portions (34) circumferentially alternating with the plurality of body recesses (30), and each outer peripheral portion (34) intersects the median plane (M) to define the arc of a first pie-shaped sector (S1) having a first center point (C1) contained in the axis of rotation (R), and
 wherein each first pie-shaped sector (S1) at least partially contains the axial projection of a single support pad (24, 24').

7. The cutter body assembly (20, 20') according to claim 6, wherein the plurality of first pie-shaped sectors (S1) are identical to each other.

8. The cutter body assembly (20, 20') according to claim 1, wherein the plurality of support pads (24, 24') are identical to each other, and
 wherein an equal number of support pads (24, 24') intersect each of the two annular-shaped planes (P1).

9. The cutter body assembly (20, 20') according to claim 1, wherein two circumferentially adjacent support pads (24, 24') intersect different annular-shaped planes (P1).

10. The cutter body assembly (20, 20') according to claim 1, wherein the cutter body (22) has a plurality of pad pockets (40) for mounting and indexing the plurality of support pads (24, 24'), and each support pad (24, 24') has an axially outermost point (NO) located a second distance (D2) from the median plane (M), and
 wherein each support pad (24, 24') is indexable in its associated pad pocket (40) to increase or decrease the second distance (D2).

11. The cutter body assembly (20, 20') according to claim 10, wherein the second distance (D2) is equal to or greater than the first distance (D1).

12. The cutter body assembly (20, 20') according to claim 10, wherein each pad pocket (40) has a planar seat surface (42) non-parallel to the median plane (M), and each support pad (24) has opposing upper and lower surfaces (44, 46) and a pad peripheral surface (48) extending therebetween, and
 wherein each lower surface (46) abuts its associated seat surface (42) in each index position of the support pad (24, 24').

13. The cutter body assembly (20, 20') according to claim 12, wherein each support pad (24, 24') is indexable about a pocket axis (A1) perpendicular to its associated seat surface (42).

14. The cutter body assembly (20, 20') according to claim 13, wherein each support pad (24, 24') is removably fastened in its associated pad pocket (40) by means of a fastening screw (58).

15. The cutter body assembly (20) according to claim 14, wherein each support pad (24) has a protuberance (60) extending away from its lower surface (46), and
 wherein the fastening screw (58) threadingly engages a first threaded bore (60) in a distal surface (64) of the protuberance (60).

16. The cutter body assembly (20) according to claim 15, wherein the first threaded bore (60) is coaxial with the pocket axis (A1).

17. The cutter body assembly (20, 20') according to claim 12, wherein each seat surface (42) forms an acute first inclination angle ($\alpha 1$) with the median plane (M), and
 wherein the first inclination angle ($\alpha 1$) has a value of less than 20 degrees.

18. The cutter body assembly (20, 20') according to claim 12, wherein each pad peripheral surface (48) has an upper portion (50) intersecting its associated upper surface (44), and each upper portion (50) exhibits N-fold rotational symmetry about a pad axis (A2),
 wherein each support pad (24, 24') has N index positions in its associated pad pocket (40), and
 wherein the pad axis (A2) is non-perpendicular to its associated seat surface (42).

19. The cutter body assembly (20, 20') according to claim 18, wherein each pad axis (A2) forms an acute second inclination angle ($\alpha 2$) with its associated seat surface (42), and
 wherein the second inclination angle ($\alpha 2$) has a value of greater than 80 degrees.

20. The cutter body assembly (20, 20') according to claim 18, wherein:
 said each upper portion (50) has N planar facets (50), and
 wherein at least three consecutive planar facets (54) about the pad axis (A2) face an equal number of corresponding planar walls (56) in the associated pad pocket (40).

21. The cutter body assembly (20, 20') according to claim 12, wherein the axially outermost point (NO) of each support pad (24, 24') is formed on its upper surface (44), and
 wherein each upper surface (44) is convexly shaped.

22. A cutting tool (70) comprising:
 a cutter body assembly (20) according to claim 1; and
 a plurality of cutting inserts (32) removably retained in the cutter body (22) and circumferentially spaced about the body peripheral surface (28),
 wherein each of the plurality of support pads (24) is configured to make operative contact with a machined surface (76a, 76b) of a workpiece (78), and
 wherein the machined surface (76a, 76b) is perpendicular to the axis of rotation (R).

23. The cutting tool (70) according to claim 22, wherein the total number of support pads (24) and the total number of cutting inserts (32) are equal.

24. The cutting tool (70) according to claim 22, wherein not all of the plurality of support pads (24) intersect the same annular-shaped plane (P1).

25. The cutting tool (70) according to claim 24, wherein the plurality of support pads (24) are identical to each other, and wherein an equal number of support pads (24) intersect each of the two annular-shaped planes (P1).

26. The cutting tool (70) according to claim 24, wherein two circumferentially adjacent support pads (24) intersect different annular-shaped planes (P1).

27. The cutting tool (70) according to claim 22, wherein an operative cutting edge (80) of each of the plurality of cutting inserts (32) intersects exactly one of the two annular-shaped planes (P1) and also the median plane (M) at a median intersection point (IM).

28. The cutting tool (70) according to claim 27, wherein the operative cutting edges (80) of two circumferentially adjacent cutting inserts (32) intersect different annular-shaped planes (P1).

29. The cutting tool (70) according to claim 28, wherein the median intersection points (IM) of two circumferentially adjacent cutting inserts (32) define the arc end points of a second pie-shaped sector (S2) having a second center point (C2) contained in the axis of rotation (R), and
wherein each second pie-shaped sector (S2) contains the axial projection of a single support pad (24).

30. The cutting tool (70) according to claim 29, wherein each support pad (24) is located rotationally rearward of the circumferentially adjacent cutting insert (32) whose operative cutting edge (80) intersects a different annular-shaped plane (P1) than that of the support pad (24).

31. The cutting tool (70) according to claim 29, wherein the axial projection of each support pad (24) radially overlaps its two circumferentially adjacent cutting inserts (32).

32. The cutting tool (70) according to claim 31, wherein the axial projection of each support pad (24) is located closer to the circumferentially adjacent cutting insert (32) whose operative cutting edge (80) intersects a different annular-shaped plane (P1) to that of the support pad (24) than the circumferentially adjacent cutting insert (32) whose operative cutting edge (80) intersects the same annular-shaped plane (P1) as that of the support pad (24).

33. The cutting tool (70) according to claim 29, wherein the plurality of second pie-shaped sectors (S2) are identical to each other.

34. The cutting tool (70) according to claim 27, wherein not all of the plurality of operative cutting edges (80) intersect the same annular-shaped plane (P1).

35. The cutting tool (70) according to claim 34, wherein the plurality of cutting inserts (32) are identical to each other, and
wherein an equal number of operative cutting edges (80) intersect each of the two annular-shaped planes (P1).

36. The cutting tool (70) according to claim 34, wherein the rotary cutting tool (70) is configured to cut a slot (82) in the workpiece (78) having two parallel machined surfaces (76a, 76b), and
wherein the slot (82) has a slot width (W) equal to or greater than two times the first distance (D1).

37. The cutting tool (70) according to claim 36, wherein the median plane (M) bisects the slot (82).

38. The cutting tool (70) according to claim 22, wherein the cutter body (22) has a plurality of pad pockets (40) for mounting and indexing the plurality of support pads (24), and each support pad (24) has an axially outermost point (NO) located a second distance (D2) from the median plane (M), and
wherein each support pad (24) is indexable in its associated pad pocket (40) to increase or decrease the second distance (D2).

39. The cutting tool (70) according to claim 38, wherein the second distance (D2) is equal to or greater than the first distance (D1).

40. The cutting tool (70) according to claim 38, wherein each pad pocket (40) has a planar seat surface (42) non-parallel to the median plane (M), and each support pad (24) has opposing upper and lower surfaces (44, 46) and a pad peripheral surface (48) extending therebetween, and
wherein each lower surface (46) abuts its associated seat surface (42) in each index position of the support pad (24).

41. The cutting tool (70) according to claim 40, wherein each support pad (24) is indexable about a pocket axis (A1) perpendicular to its associated seat surface (42).

42. The cutting tool (70) according to claim 41,
wherein each pocket axis (A1) intersects the two annular-shaped planes (P1) at first and second intersection points (I1, I2), and each seat surface (42) faces towards the annular-shaped plane (P1) containing its associated first point (I1), and
wherein each first intersection point (I1) is located rotationally forward of its associated second intersection point (I2).

43. The cutting tool (70) according to claim 40, wherein the axially outermost point (NO) of each support pad (24) is formed on its upper surface (44), and
wherein each upper surface (44) is convexly shaped.

44. A support pad (24, 24') removably retainable in a disk-shaped cutter body (22), comprising:
opposing upper and lower surfaces (44, 46) and a pad peripheral surface (48) extending therebetween,
the lower surface (46) being planar and configured to abut an associated seat surface (42) of a pad pocket (40) in the cutter body (22), and
the pad peripheral surface (48) having an upper portion (50) intersecting the upper surface (44),
wherein the upper portion (50) exhibits N-fold rotational symmetry about a pad axis (A2), and
wherein the pad axis (A2) is non-perpendicular to the lower surface (46).

45. The support pad (24, 24') according to claim 44, wherein N is a value of at least three.

46. The support pad (24, 24') according to claim 44, wherein the upper surface (44) is convexly shaped, and configured to make operative contact with a machined surface (76a, 76b) of a workpiece (78).

47. The support pad (24, 24') according to claim 44, where the upper portion (50) has N planar facets (54).

48. A cutter body assembly comprising:
a disk-shaped cutter body having an axis of rotation and a direction of rotation (DR) about the axis of rotation (R);
the cutter body comprising a central hub connected to an outer annular body portion, two opposing end surfaces, a body peripheral surface extending between the two opposing end surfaces, and a plurality of insert receiving pockets circumferentially spaced about the body peripheral surface; and
a plurality of support pads located radially inward of the body peripheral surface, each support pad protruding axially outwardly of an entirety of only one of the two opposing end surfaces.

49. The cutter body assembly (20, 20') according to claim 48, wherein:
the support pads (24, 24') are provided on the outer annular body portion (23) on both of the opposing end surfaces (26a, 26b); and each of the support pads (24, 24') is removably retained in a pad pocket (40) formed on one of the opposing end surfaces (26*a*, 26*b*).

50. A cutting tool (70) comprising:

the cutter body assembly (20; 20') according to claim 48; and a plurality of cutting inserts (32) removably retained in the insert receiving pockets (74), each cutting insert (32) having an operative cutting edge (80), the cutting inserts collectively defining a slot width (W) of the cutting tool (70);

wherein:

the support pads (24, 24') are provided on the outer annular body portion (23) on both of the opposing end surfaces (26*a*, 26*b*); and the support pads (24,24') collectively have an axial extent corresponding to the slot width (W).

\* \* \* \* \*